Nov. 16, 1926.
C. A. BODDIE
REGULATOR SYSTEM
Filed August 28, 1922
1,606,743
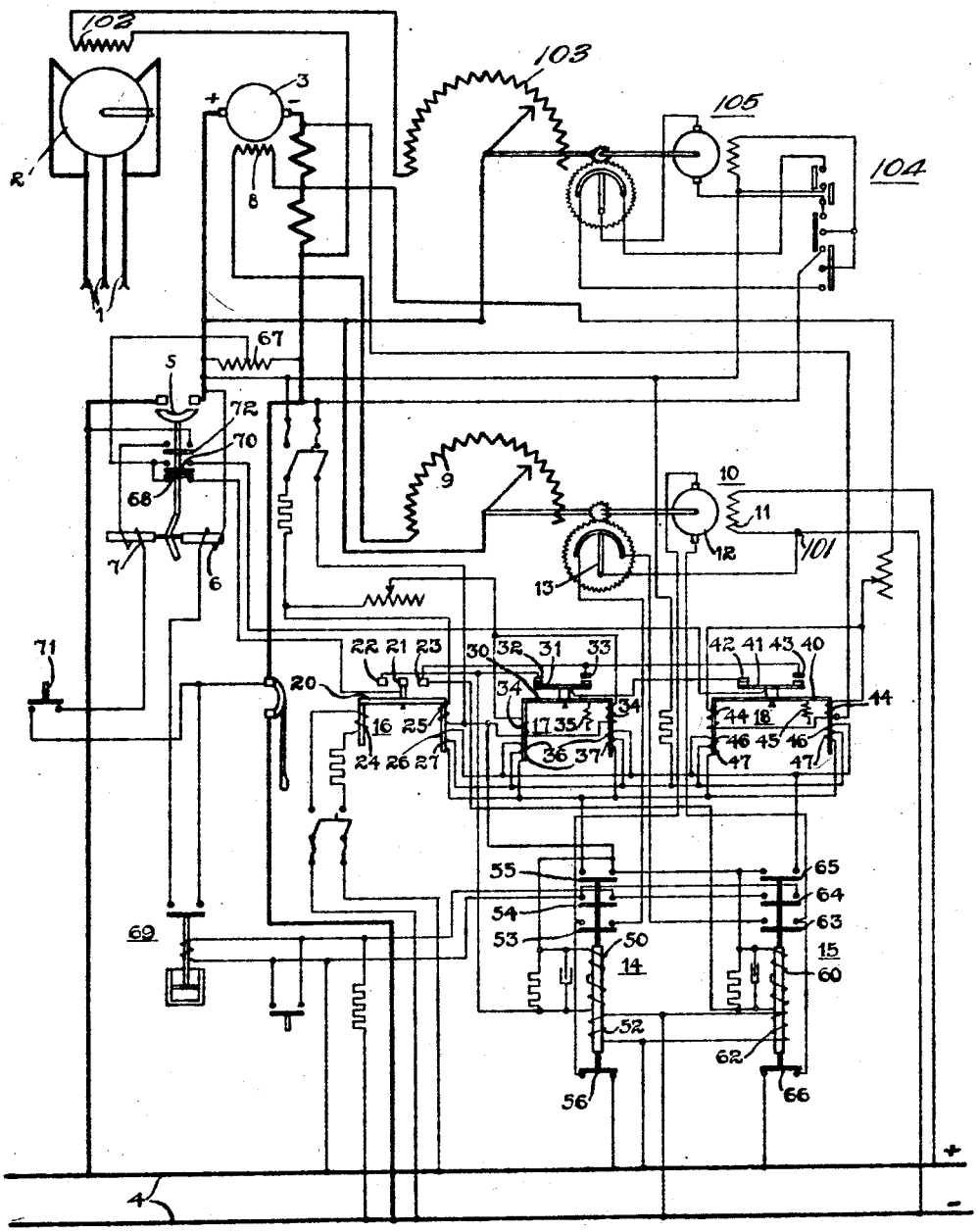
WITNESSES:
INVENTOR
Clarence A. Boddie.
BY
ATTORNEY Patented Nov. 16, 1926.

1,606,743

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed August 28, 1922. Serial No. 584,600.

My invention relates to voltage-regulator systems and particularly to systems for controlling the voltage of a generator supplying energy to a direct-current system.

One object of my invention is to provide a regulator system wherein the voltage of the generator is regulated to correspond to the voltage of the circuit to which it is to be connected and thereafter regulated to be maintained substantially constant at a predetermined normal operating value.

Another object of my invention is to provide means whereby the voltage may be regulated upon the occurrence of an abnormal demand on the generator to preclude current from traversing the generator in excess of a predetermined value.

A further object of my invention is to provide means whereby a single motor-operated rheostat may be controlled by the various regulating devices to control the excitation of the shunt field winding of the generator to regulate the voltage thereof in accordance with load conditions.

In practicing my invention, I provide a differentially operative member that is responsive to the difference between the voltages of the generator and of the circuit, respectively, to control, by means of a rheostat, the excitation of the shunt field winding of the generator. When the voltage of the generator corresponds to that of the circuit, the generator is connected thereto and a second voltage-regulating device that is adjusted to maintain the voltage of the generator at a predetermined value, becomes operative to control the rheostat according to such adjustment.

If the load on the generator should increase to, or above, a predetermined percentage of its full-load capacity, a third regulating device, that is adjusted to operate only when the current attains a predetermined value, becomes operative to control the excitation of the shunt field winding and, simultaneously, to render the voltage-controlling element ineffective.

As the load on the generator then decreases, the current-responsive regulating device becomes ineffective and permits the voltage-regulating device to become effective in maintaining the voltage of the generator at the predetermined value.

The single figure of the accompanying drawing is a view of an electric circuit including an arrangement of the controlling devices embodying my invention.

In the system that is illustrated, alternating-current energy is received from an alternating-current circuit 1 by a synchronous motor 2 and translated to direct-current energy by a generator 3. The motor may be started automatically or manually in any approved manner and, for the purpose of this invention, may be considered as having been started and accelerated to synchronous speed.

A switching device 5, that is provided with a closing coil 6 and a trip coil 7, is employed to connect the generator to the circuit 4. It is desirable, before connecting the generator to the direct-current circuit 4, that the voltage of the generator correspond to the voltage of the direct-current circuit in order to obviate any surges on the system.

After the generator is connected to the circuit, it is desirable to regulate the voltage of the generator to maintain the same substantially constant at a predetermined normal operating value. It is desired also, however, to diminish the voltage of the generator if the load should increase beyond a predetermined amount, in order to preclude the current transferred to the circuit from exceeding the predetermined value.

The regulation of the voltage of the generator 3 is procured by controlling the excitation of the shunt field winding 8 by means of a rheostat 9. The rheostat is controlled by a reversible motor 10 comprising a field 11 and an armature 12. In order to preclude overtravel of the contact arm of the rheostat 9, a limit switch 13 is provided.

The operation of the motor 10, which controls the position of the rheostat 9, is controlled by two switching devices 14 and 15 which serve as reversing switches for the armature 12 of the rheostat motor. The field winding of the motor 10 is permanently energized from the load circuit 4. The operation of the reversing switches 14 and 15, in controlling the rheostat, is controlled by three regulating devices 16, 17 and 18, respectively.

The regulating device 16 comprises a pivoted lever 20 which controls the engagement of a movable contact member 21 with two stationary contact members 22 and 23, according to the relative degree of energization of two windings 24 and 25. The winding 24 is energized in accordance with the voltage of the direct-current circuit and the winding 25 is energized in accordance with the voltage of the generator 3.

In order to prevent overtravel or hunting of the regulating device 16, two anti-hunting windings 26 and 27 are provided to cooperate with the winding 25. Until the voltage of the generator attains a predetermined value corresponding to the voltage of the direct-current circuit, the contact members 21 and 22 are engaged.

The regulating device 17 comprises a pivoted member 30 that controls the engagement of a movable contact member 31 with two stationary contact members 32 and 33, respectively, depending upon the energization of two operating windings 34 relative to the adjustment of a spring 35. The windings 34 are both connected in parallel and, when energized, co-operate to actuate the pivoted member 30 in a counter-clockwise direction against the tension force of the spring 35. With each winding 34 are associated two anti-hunting windings 36 and 37.

The function of the regulating device 17 is to control the energization of the shunt field winding 8 by means of the rheostat 9 to maintain the voltage of the generator substantially constant at a predetermined value so long as the load upon the generator does not exceed a predetermined value, such as, for example, 125% full load.

When the load on the generator, that is, the current drawn therefrom by the circuit 4, exceeds a value corresponding to 125% of its full-load rating, the regulating device 18 becomes operative to decrease the voltage of the generator in order to limit the current that may be supplied by the generator to the predetermined value of 125% full load.

The regulating device 18 is similar in construction and in operation to the regulating device 17 and comprises a pivoted member 40 that controls the engagement of a movable contact member 41 with either of two stationary contact members 42 and 43, according to the degree of energization of two windings 44 relative to the tension force of an adjustable spring 45. With the windings 44 are associated two anti-hunting windings 46 and 47, respectively.

The reversing switch 14 comprises winding 50 and a winding 52 that is differentially disposed with respect to the winding 50. When the winding 50 is energized, the switch 14 is actuated to close three interlock switches 53, 54 and 55 and to open an interlock switch 56. When the winding 50 is de-energized, the switch 14 is maintained in its lower position and the interlock switch 56 is maintained in effective engagement by the differential winding 52 which is continuously energized from the direct-current circuit 4.

The switching device 15 is similar in construction and in operation to the switch 14 and comprises a winding 60 acting, when energized, to raise the switch 15, a differentially-disposed coil 62 acting to maintain the switch 15 in its lower position and three switches 63, 64 and 65 that are opened when the coil 60 is de-energized and a switch 66 that is closed when the coil 60 is de-energized.

Control energy, whereby the regulating devices actuate the reversing switches 14 and 15, is derived from the generator 3 through a resistor 67 that is connected to the terminals of the generator. When the motor is accelerated to synchronous speed, the generator electromotive force gradually increases until it corresponds to the voltage of the direct-current circuit 4. Until the voltage of the generator increases to a value corresponding to the voltage of the direct-current circuit 4, the contact members 21 and 22 of the regulator 16 are engaged. Under such conditions, the windings 50 and 51 of the switch 14 are included in an energizing circuit proceeding from the positive terminal of the generator through the resistor 67, an interlock switch 68, that is controlled by the direct-current switch 5, the contact members 21 and 22 of the regulator 16 and the windings 50 and 51 to the negative terminal of the generator 3. The switch 14 is therefore maintained in its energized position, closing switches 53, 54 and 55 and opening switch 56.

Switch 53, in closing, completes a circuit proceeding from the positive conductor of the direct-current circuit 4 through the interlock switch 66 of the reversing switch 15 through the motor armature 12 of the motor 10, the switch 53 of the reversing switch 14, the limit switch 13 to the junction point 101, and to the negative conductor of the circuit 4. The rheostat 9 is thereupon actuated to its "all-out" position and the circuit of the actuating motor is then opened by the limit switch 13 to prevent overtravel of the contact arm of the rheostat.

While the reversing switch 14 is closed and regulates the rheostat 9 to its "all-out" position, the switch 54 serves to short-circuit the operating coil of an auxiliary relay 69 which controls the circuit of the closing coil 6 of the main direct-current switch 5. While the reversing switch 14 is energized, the switch 55 connects the anti-hunting windings 27, 37 and 47 to the terminals of the generator.

At present, however, we need consider only the action of the winding 27. It cooperates with the winding 25 that is energized from the generator to so increase the excitation of the winding 25 that the torque of the winding 24 may be counterbalanced slightly before the voltage of the generator attains the value corresponding to that of the direct-current circuit 4. The contact members 21 and 22 are thereupon disengaged and the reversing switch 14 opens.

If the voltage of the generator continues to increase, by reason of the fact that there is no resistance in series with the shunt field winding, the contact members 21 and 23 will engage, thereby completing a circuit to energize the operating windings of the reversing switch 15 to effect the actuation thereof to its energized position.

Switch 63 is now closed and serves to complete the energizing circuit for the armature of the rheostat motor 10 in such direction as to effect the actuation of the contact arm of the rheostat 9 to insert resistance in the circuit of the shunt field winding. Switch 64, which is connected in parallel with switch 54 of the reversing switch 14, serves to maintain a short-circuit connection across the operating coil of the auxiliary relay 69 to prevent the energization thereof. Switch 65 connects the anti-hunting windings 26, 36 and 46 across the terminals of the generator but, at present, only the winding 26 need be considered which serves to diminish the torque of the winding 25 until the effect thereof corresponds to the torque of the winding 24. The contact members 21 and 23 are thereupon disengaged and the reversing switch 15 returns to its initial de-energized position.

Let it be assumed that the voltage of the generator and the voltage of the circuit now correspond. Since the switches 54 and 64 of the reversing switches 14 and 15 are now open, the winding of the relay 69, which is connected across the circuit 4, will be energized and, after a predetermined interval, depending upon the adjustment thereof, the relay will close to complete the circuit of the closing coil 6, whereupon the main switch 5 is closed to connect the generator 3 to the circuit 4.

After the switch 5 closes to connect the generator to the circuit, the interlock switch 68 is opened and an interlock switch 70 is closed. The interlock switch 68, in opening, disconnects the contact member 21 of the regulator 16 from the resistor 67, thereby removing its operating potential and rendering the regulating device 16 ineffective.

The switch 70, in closing, connects the movable contact member 41 of the regulating device 18 to the resistor 67. Since the regulator 18 is adjusted to disengage the contact members 41 and 42 only when the current traversing the generator exceeds a predetermined amount, the contact members 41 and 42 will normally be engaged and thereby impress controlling potential from the resistor 67 upon the contact member 31 of the regulating device 17.

If the voltage of the direct-current circuit 4 is less than its normal operating voltage when the generator is connected thereto, the regulating device 17 will be energized to a degree less than the value for which it is adjusted, and the contact members 31 and 32 will be engaged. The reversing switch 14 will thereupon be energized. The rheostat 9 will consequently be actuated to control the excitation of the shunt field winding of the generator 3 to increase the voltage thereof to the value for which the regulator 17 is adjusted.

If the voltage should increase beyond the operating voltage, the consequent engagement of the contact members 31 and 33 would serve to reduce the voltage by energizing the reversing switch 15 which would effect the desired operation of the rheostat 9.

So long as the load upon the generator does not exceed the predetermined value of 125% full load, the regulator 18 is ineffective. If the current increases to such value, however, the windings 44 will be sufficiently energized to counterbalance the torque of the spring 45 and effect engagement of the contact members 41 and 43. The reversing switch 15 will thereupon be energized to effect such actuation of the rheostat 9 and will reduce the voltage of the generator to the value at which only the predetermined maximum amount of current will be permitted to traverse the generator. It will be noted that the regulating device 18 controls only the diminishing of the generator voltage and not the increasing thereof.

When it is desired to disconnect the generator from the circuit, a switch 71 is closed to connect the trip coil 7 across the terminals of the generator. An interlock switch 72, that is controlled by the main switch 5, serves to open the circuit of the trip coil when the switch 5 opens. The switch 71 may be manually operated or it may be automatically operated in response to any predetermined condition, as by protective relays that may be employed for any purpose.

The excitation of the field winding 102 of the motor 2 is illustrated as supplied by the generator 3 and controlled by a rheostat 103, the position of which may be governed by a manually-operable control switch 104 and the motor 105.

It will be observed that my invention contemplates means for regulating the voltage of the generator to correspond to that of a direct-current circuit before connecting the generator thereto; that it further contemplates the regulation of the generator voltage after the generator is connected to the circuit to maintain the operating voltage substantially constant at a predetermined normal operating value so long as the load upon the generator does not exceed a predetermined value; and that, if the load does attain or exceed such predetermined value, the voltage of the generator will be reduced to a value at which the maximum value of the current will be maintained at the predetermined value.

My invention is not limited to the specific details and the arrangement thereof that are illustrated but may be varied without departing from the spirit and scope of my invention, as set forth in the appended claims.

I claim as my invention:

1. The combination with a direct-current circuit and a generator for supplying energy thereto, of means comprising a differentially energized and normally-balanced member for regulating the generator voltage to correspond to the circuit voltage, means for then connecting the generator to the circuit, means responsive to the generator voltage for regulating the same to maintain the value thereof substantially constant at a predetermined value, and means responsive to the generator current for regulating the voltage thereof to limit the current to a predetermined value.

2. The combination with a direct-current circuit and a generator provided with a field winding for supplying energy thereto, of connecting means therebetween, a motor-operated rheostat for the field winding, reversing switches for controlling the motor, means differentially energized from the generator and the circuit for controlling the reversing switches before the connecting means are rendered effective, means for rendering the connecting means effective and means operative thereafter for controlling the field rheostat in accordance with both the voltage of, and the current supplied by, the generator.

3. The combination with a direct-current circuit and a generator provided with a field winding for supplying energy thereto, and connecting means therebetween, of a differential voltage-responsive element for controlling the connecting means, and means operative after the connecting means has functioned for regulating the voltage of the generator to maintain the same constant within a predetermined load range.

4. The combination with an electric circuit, a generator provided with a field winding for supplying energy to the circuit and connecting means therebetween, means for regulating the generator voltage to correspond to the circuit voltage to permit the operation of the connecting means, and operative after the generator is connected to the circuit for regulating the voltage of the generator in accordance with the voltage of, and the current supplied by, the generator and means for preventing hunting of the regulating means.

5. The combination with an electric circuit, a generator provided with a field winding for supplying energy to the circuit and connecting means therebetween, of a rheostat for controlling the excitation of the field winding, a reversible motor for the rheostat, switching devices for controlling the reversible motor, means for actuating the switching devices severally responsive to the voltage of and the current traversing the generator, anti-hunting means associated with the switch-actuating means and means controlled by the switching devices for selectively rendering the anti-hunting means effective according to the operation controlled by the respective switching devices.

6. The combination with an electric circuit, a generator provided with a field winding for supplying energy to the circuit and connecting means therebetween, of regulating means for controlling a characteristic of the generator according to different electrical conditions of the generator comprising a motor-operated rheostat and switching means therefor, a member responsive to the voltage of the generator, a member responsive to the current traversing the same and means co-operatively controlled thereby for controlling the switching means.

7. In a regulator system, the combination with an electric circuit and a generator provided with a field winding for supplying power to said circuit, of means for varying the excitation of said field-magnet winding, said means comprising means differentially responsive to the machine voltage and the circuit voltage, means operative over a certain generator load range for maintaining a substantially constant generator voltage, and means operative at a predetermined generator load for limiting the generator current.

In testimony whereof I have hereunto subscribed my name this 26th day of August, 1922.

CLARENCE A. BODDIE.